United States Patent [19]
Jensen et al.

[11] Patent Number: 5,345,564
[45] Date of Patent: Sep. 6, 1994

[54] SERIAL COMMUNICATION PERIPHERAL INTEGRATED ELECTRONIC CIRCUIT THAT RECOGNIZES ITS UNIQUE ADDRESS BEFORE THE ENTIRE CIRCUIT IS ENABLED

[75] Inventors: Bradley D. Jensen, San Jose, Calif.; Ed Morson, Maple, Canada

[73] Assignee: Zilog, Inc., Campbell, Calif.

[21] Appl. No.: 861,298

[22] Filed: Mar. 31, 1992

[51] Int. Cl.$^5$ ............................................. G06F 13/00
[52] U.S. Cl. .................................... 395/275; 395/550
[58] Field of Search ............... 395/200, 275, 325, 500, 395/725, 550

[56] References Cited

U.S. PATENT DOCUMENTS

| | | |
|---|---|---|
| 4,615,005 | 9/1986 | Maejima et al. . |
| 4,841,440 | 6/1989 | Yonezu et al. . |
| 5,111,423 | 5/1992 | Kopec, Jr. et al. ................ 395/500 |

*Primary Examiner*—Robert L. Richardson
*Attorney, Agent, or Firm*—Majestic, Parsons, Siebert & Hsue

[57] ABSTRACT

A peripheral integrated electronic circuit of the type having an interface for serially transferring data between it and a central processing unit ("CPU") in a computer system that employs a number of such peripheral circuits that are selectively rendered operable by the CPU, one at a time. The peripherals each include an interface that receives an initial data word from the CPU that identifies the peripheral circuit with which data is to be transferred by the CPU. Rather than all such peripherals in a computer system being powered-up in order to have their processors determine individually under software control whether they have been identified by the CPU, only a small hardwired interface circuit is so enabled. Once this interface circuit determines that the CPU desires to conduct data transfer with it, the main portion of the circuit, including its processor, is then powered-up.

3 Claims, 2 Drawing Sheets

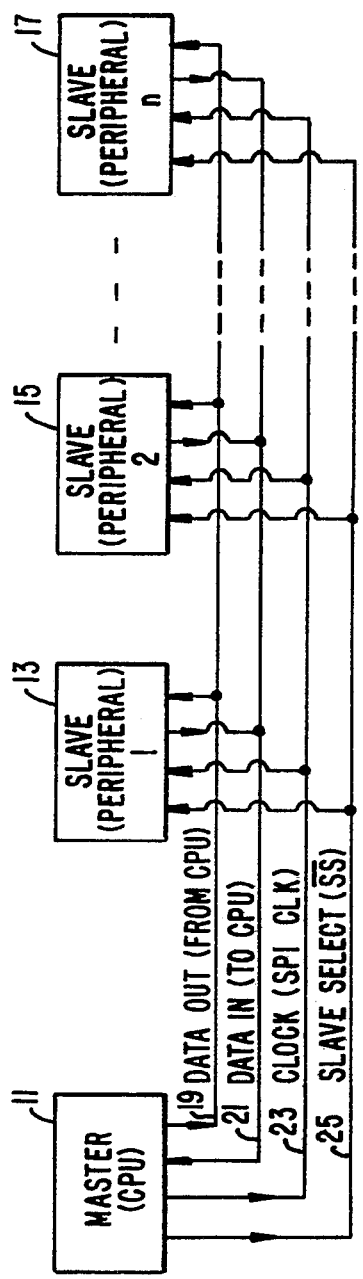
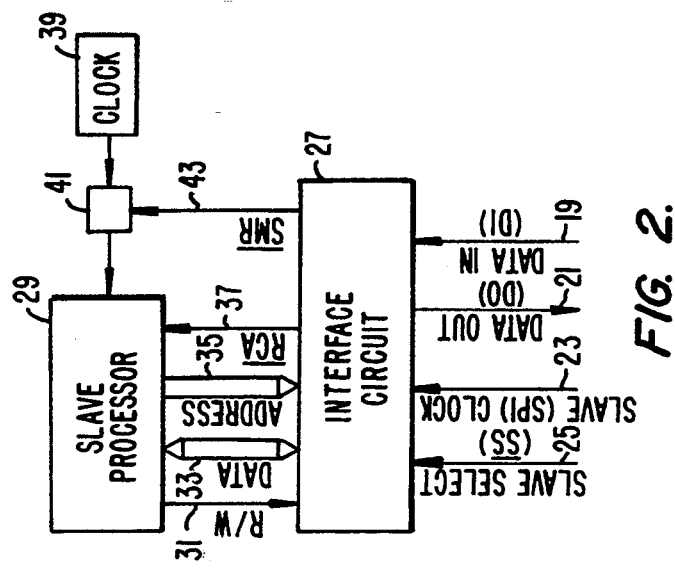

SERIAL COMMUNICATION PERIPHERAL INTEGRATED ELECTRONIC CIRCUIT THAT RECOGNIZES ITS UNIQUE ADDRESS BEFORE THE ENTIRE CIRCUIT IS ENABLED

BACKGROUND OF THE INVENTION

This invention is related generally to computer system peripheral integrated circuits and their use, and, more specifically, to a technique and circuit for enabling a master processing unit to select one of several peripheral circuits having slave processing units for data communication with the master.

A commonly used technique for transferring data between a central processing unit ("CPU") and a selected one of several peripheral circuits is by serial communication. A known serial peripheral interface ("SPI") utilizes four lines for full duplex communication, one line for digital data being received by the peripheral, another for digital data being sent by the peripheral, another for a clock signal and another for a select line. Half duplex communication requires only three lines, the line to send data from the peripheral not being utilized. All of these lines are connected between the CPU, acting as a master device, and each of the peripheral circuits, acting as slaves.

In order to avoid running separate peripheral select lines from the CPU to each of the peripheral circuits, a single line is utilized with a first data word transmitted by the CPU to each of the peripherals containing an identification of the one peripheral with which the CPU is to establish data communication. The unique identification code within each of the peripherals is then compared with that first data word, and the peripheral that detects a positive comparison enables itself for the communication while the other peripherals remain in a passive state.

This identification code comparison is usually accomplished by a slave processor that exists as part of each of the peripheral circuits executing a software routine. It is a primary object of the present invention to improve this peripheral identification technique.

SUMMARY OF THE INVENTION

This and additional objects are accomplished by the present invention wherein, briefly and generally, a small hardwired circuit is provided at each interface of the slave peripheral with the master CPU that compares the first data word received from the CPU with an internally programmed unique identification code. The remainder of the peripheral, including its processor and other active circuitry, is enabled only after a positive comparison is made. Only the small amount of comparator circuitry of each peripheral is awakened by the CPU when a communication link is to be established. The active portion of each of the peripherals in the system remains asleep except for that of the one peripheral having an internally stored identification code that matches the peripheral selecting data word sent by the CPU. A primary advantage of this technique is a reduction in the amount of power consumed by the peripheral circuits, and thus a reduction in the power that must be supplied to a computer system that includes two or more such peripherals.

Additional objects, features and advantages of the present invention will become apparent from the following description of a preferred embodiment thereof, which description should be taken in conjunction with the accompanying drawings.

BRIEF DESCRIPTION OF THE DRAWINGS

FIG. 1 schematically illustrates a computing system utilizing a plurality of peripheral circuits that incorporates the improvement of the present invention;

FIG. 2 is a block diagram of each of the peripherals (slaves) shown in the block diagram of FIG. 1;

DESCRIPTION OF A PREFERRED EMBODIMENT

Referring initially to FIG. 1, a digital system includes a master unit 11 and a plurality of slave units 13, 15 . . . 17. An example of such a system is a special purpose computer system wherein the master unit 11 is a system CPU and each of the slave units 13, 15 . . . 17 is a peripheral circuit that interfaces with various elements and systems outside of the computer system shown in FIG. 1.

Figure 4:
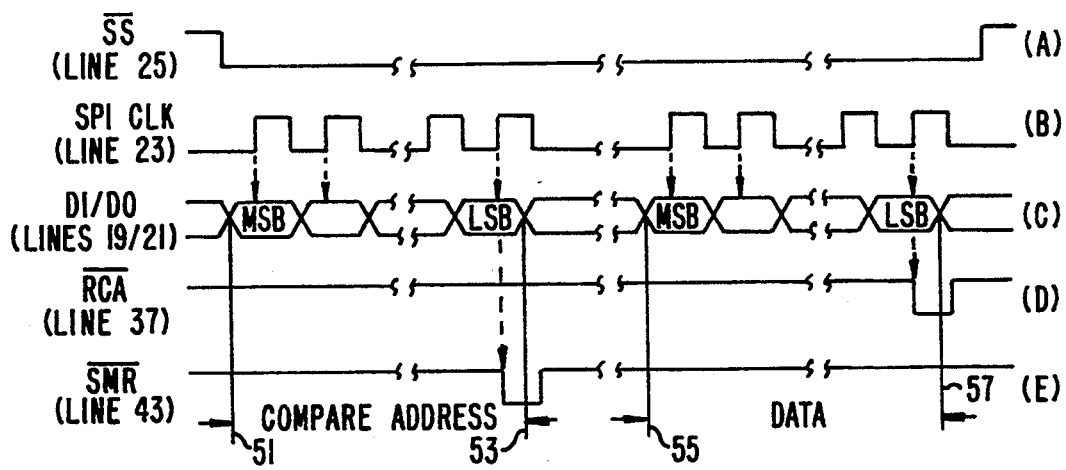
FIGS. 4(A)–4(E) provide a timing diagram illustrating an operation of the system of FIG. 1 with peripherals of the type illustrated in FIGS. 2 and 3.

The peripheral circuits 13, 15 . . . 17 are connected in parallel with each other and the CPU 11 through four circuits to establish full duplex communication between the CPU and the various peripherals as selected. These circuits, usually a single conductor, include a line 19 transmitting data from the CPU to the peripherals, a line 21 for transmitting data from the peripherals to the CPU 11, a line 23 for the CPU to supply an operating clock signal to the peripherals, and a line 25 providing a control signal that designates when transfer of data is occurring between the CPU 11 and one or more peripherals 13, 15 . . . 17. This "slave select" signal in line 25 is shown in FIG. 4(A) in a system timing diagram example. The clock signal on line 23 is shown in FIG. 4(B) and the timing of a data transfer in either of the lines 19 or 21 shown in FIG. 4(C). The technique of the present invention applies to a system with two or more peripherals, "n" peripherals being shown in the system of FIG. 1.

Referring to FIG. 2, a block diagram showing the overall construction of each of the peripheral circuits 13, 15 . . . 17 of FIG. 1 is shown. Each of the four lines 19, 21, 23 and 25 connects with an interface circuit 27, which itself is shown in more detail in FIG. 3. Central to operation of each peripheral is an internal processor 29 that performs the functions for which the peripheral is included in the computer system. The processor 29 is connected with the interface circuit 27 through a read-/write line 31, internal data and address busses 33 and 35, and a line 37 that provides a signal when a character byte has been received by the interface circuit 27. An example of this signal is provided as part of the timing diagram in FIG. 4(D).

Rather than the entire peripheral circuit being driven by the clock signal provided in line 23 by the system CPU 11, the slave processor 29 is driven by a separate clock source 39 through a switching element 41 that is controlled by a signal and a control line 43. As shown in the timing diagram FIG. 4(E), and described in more detail below, the line 43 becomes active in a pulse that indicates the interface circuit 27 has determined that this peripheral is being accessed by the system CPU 11. After this determination is made, the switch 41 connects the clock 39 to drive the slave processor 29. At all other times, the slave processor 29 has no clock signal connected to it and, particularly if implemented in complimentary metal-oxide-silicon ("CMOS"), results in the slave processor 29 consuming substantially no power during those periods when the peripheral is not being accessed.

The interface circuit 27, preferably also formed of CMOS components, is controlled by the system CPU 11 providing a clock signal in the line 23 only during periods when data communication with a peripheral is occurring or is about to occur. Although the interface circuits 27 of each of the peripherals 13, 15 . . . 17 are thus enabled when the clock signal in the common line 23 is turned on, these circuits are a small part of each peripheral and thus those in the peripheral not being accessed at the moment consume very little power.

Figure 3:
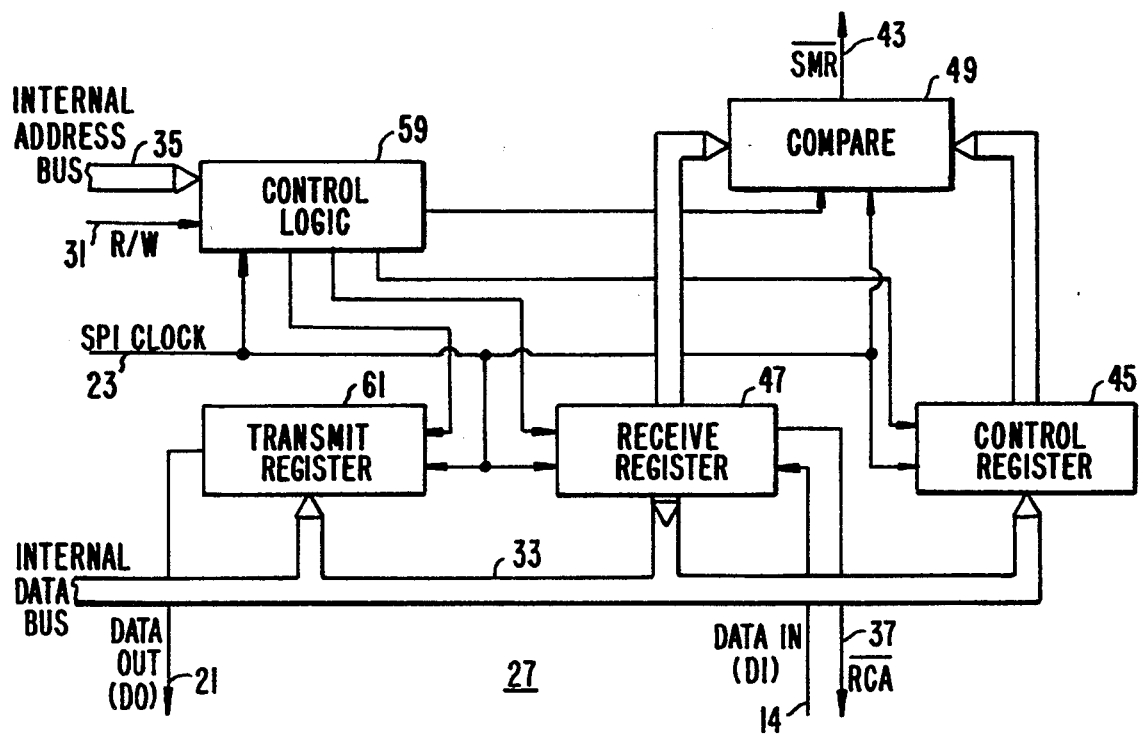
FIG. 3 illustrates one implementation of the interface circuits of FIG. 2.

FIG. 3 shows such in interface circuit 27. A control register 45 is provided for storing a unique identification (address) code of the peripheral, usually in a byte of binary data. This code is loaded into the register 45 in a normal manner, such as during an initialization routine controlled by the system CPU 11 when power is first turned onto the system after a period of no operation. A companion receive register 47 serially receives data on the line 19 from the system CPU 11 and issues the signal in line 37 (FIG. 4(D)) in the line 37 when a predetermined number of data bits have been received, conveniently eight bits to form one byte. Data is then communicated internally of the interface circuit 27 and with the peripheral slave processor 29 in parallel.

Thus, the slave processor 29, in response to a received character available signal in the line 37, accepts and utilizes the byte of data which has been accumulated in the receive register 47. The first byte of data so received after the slave select signal in line 25 (FIG. 4(A)) goes active, however, is utilized to select and enable only one or more selected of the peripheral circuits 13, 15 . . . 17. That first byte after being received by the register 47, is then compared by a comparator 49 with the identification code stored in the control register 45. If there is a positive comparison, a stop mode recovery signal in a line 43 (FIG. 4(E)) goes active and the slave processor of that peripheral is awakened by having its clock source connected to it. For those peripherals where this first data byte does not compare with the identification code stored in the control register 45, on the other hand, no such signal is given in the line 43 and its slave processor remains inactive.

This comparison in data transmission operation is best illustrated in the timing diagram of FIGS. 4(A)-4(E). At a time 51, shortly after the slave select line 25 (FIG. 4(A)) goes active, the first data word is clocked into the receive register 47 of each of the peripherals 13, 15 . . . 17 over the line 19. At a time 53, this first byte of data has been received, as indicated by FIG. 4(C), and, if a positive comparison of that byte with the identification code of the peripheral is made, the awakening signal in line 43 goes active at that same time, as shown by a negative going pulse in FIG. 4(E). At a time 55, the desired data is then transferred between the selected peripheral and the master CPU, as shown by FIG. 4(C). Each time a byte of data is received into the register 47, one such time being indicated at 57, the received character signal in line 37 goes active (FIG. 4(D)).

Referring again to FIG. 3, the reading of each of the registers 45 and 47, in operation of the comparative circuit 49, is controlled from a control logic circuit 59 through various control lines extending therefrom. An additional register 61 serves to receive a byte of data in parallel from the slave processor 29 over the internal data bus 33, and then serially to the system CPU 11 over the line 21. However, this latter register 61 is not involved in the peripheral selection or a power control function described previously. Even so, it can been seen from FIG. 3 the small number of elements that are powered up and rendered operational when the system CPU 11 starts the SPI clock signal in line 23. Little power is consumed in this circuit until, and unless, the peripheral incorporating it is chosen to become operational.

Although the present invention has been described with respect to a preferred embodiment thereof, it will be understood that the invention is entitled to protection within the full scope of the amended claims.

It is claimed:

1. In a computer system having a central processing unit ("CPU") connected in parallel with at least two peripheral units that contain unique identification codes and have internal processors, a method of activating a selected one of said at least two peripheral units to operate with the CPU, comprising the steps of:

causing the CPU to transmit one of the unique identification codes to all of said at least two peripheral units, comparing in a hardware circuit of each of said at least two peripheral units its unique identification code with the identification code being transmitted by the CPU, said comparing step occurring without activating the internal processors in any of said at least two peripheral units, selecting one of said at least two processing units wherein its unique identification code matches the transmitted identification code, and activating the internal processor within the selected one of said at least two processing units by supplying a clock signal to the internal processor of the selected peripheral processing unit without activating the internal processor in any other of said at least two peripheral units.

2. The method according to claim 1 wherein the comparing step includes activating an interface portion of each of said at least two peripheral units by starting a clock signal thereto without providing a clock signal to their internal processors.

3. A peripheral integrated electronic circuit adapted to be connected along with other such circuits to a central computer system processor, comprising:

an internal processor, a clock source, means connectable to serially receive data from the central processor for temporarily storing said data, programmable means for storing an identification code of the peripheral circuit, and comparator means connected to said data receiving means and to said programmable means for connecting said clock source to the internal processor in response to a correspondence between data in said data receiving means and an identification code stored in said identification code storing means, thereby to render the internal processor operable when the peripheral circuit receives its identification code as data from the central computer system processor.

* * * * *